May 24, 1938.  C. H. RIPPL  2,118,779
DUAL PRESSURE CONTROL FOR PNEUMATICALLY OPERATED APPARATUS
Filed Jan. 15, 1937  2 Sheets-Sheet 1

INVENTOR.
CHARLES H. RIPPL.
BY Slaugh and Canfield
ATTORNEY.

Patented May 24, 1938

2,118,779

UNITED STATES PATENT OFFICE 2,118,779

DUAL PRESSURE CONTROL FOR PNEUMATICALLY OPERATED APPARATUS

Charles H. Rippl, Cleveland, Ohio, assignor to The Clark Controller Company, Cleveland, Ohio, a corporation of Ohio Application January 15, 1937, Serial No. 120,806

12 Claims. (Cl. 303—6)

This invention relates to fluid pressure operated apparatus and to controls therefor by which different parts of the apparatus may be operated by different fluid pressures.

The invention is particularly applicable to pneumatically operated welding machines and to the pneumatically operated electric timing switches for timing the welding current utilized thereby and to the controls therefor whereby the switch may be operated at a high pressure (such for example as the full pressure of the source) and the welding machine may be operated at a reduced pressure; and while the invention has other uses it will be illustrated and described herein as applied to that use.

It is among the objects of the invention:

To provide generally an improved control for fluid pressure operated apparatus;

To provide a control for fluid pressure operated apparatus by which different operative pressures may be applied to the apparatus in an improved manner;

To provide an improved control for fluid pressure operated apparatus whereby high and low pressures may be successively applied to the apparatus;

To provide a control for pneumatically operated welding apparatus by which a relatively low operating pressure may be applied to a welding gun or other welding machines and a relatively high operating pressure may be applied to a welding current timing switch apparatus in controlled sequence.

To provide an improved valve construction for controlling application of pneumatic pressure to a welding current timing apparatus responsive to pressure conditions at a welding gun or other welding machine.

To provide a control for fluid pressure operated apparatus by which a plurality of devices may be operated successively in an improved manner from a common fluid pressure source.

To provide a control for a plurality of fluid pressure operated devices by which one device may be operated responsive to operation of another in an improved manner.

Other objects will be apparent to those skilled in the art to which my invention appertains.

My invention is fully disclosed in the following description taken in connection with the accompanying drawings in which.

Figure 1:
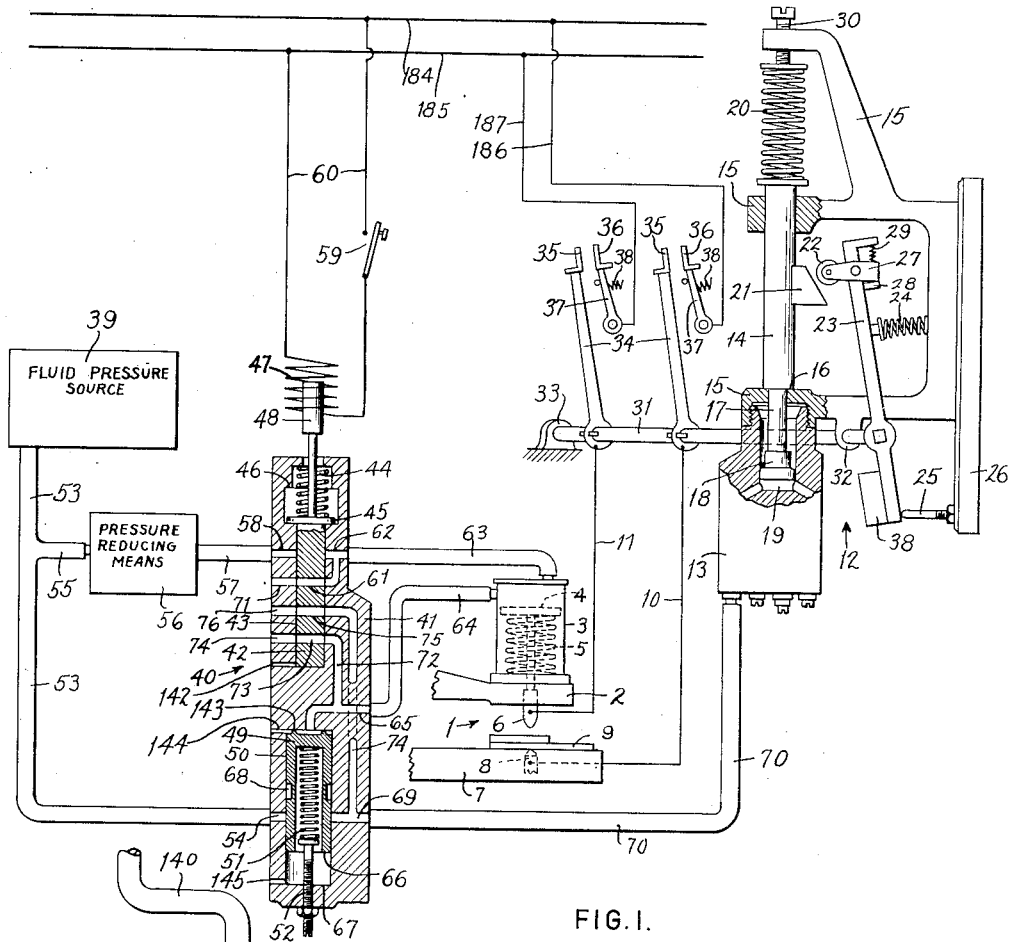
Fig. 1 is a diagrammatic view illustrating an embodiment of my invention when used in connection with a welding machine of one type.

Referring to the drawings I have shown generally at 1 a welding machine comprising an upper head 2 supporting a pneumatic cylinder 3 in which is reciprocated a piston 4 normally held in an upper position by a spring 5 and arranged to be forced downwardly upon the admission of compressed air to the cylinder above the piston and to move downwardly an upper electrode 6 connected to the piston.

A lower head 7 has associated therewith a lower electrode 8. Work pieces 9 may be supported on the lower head 7 and when the upper electrode is moved downwardly the work is engaged between the two electrodes and electric current supplied by mains 10 and 11 to the electrodes produces the weld on the work pieces 9.

The parts of the machine just described are illustrated diagrammatically and their exact construction and arrangement constitute no essential part of the present invention and inasmuch as such welding machines are well known further illustration or description thereof is deemed unnecessary herein.

Illustrated generally at 12 is an electric current timing switch, pneumatically operated and illustrated diagrammatically. The switch 12 comprises a valve housing 13 controlling the application of pneumatic pressure to the switch 12 and the exhausting of the same therefrom in the operation of the switch. The exact construction and arrangement of the parts of the switch 12 constitutes no essential part of the present invention. Such a switch constitutes the subject matter of the co-pending application of Edward G. Beiderman, Serial No. 84,981 filed June 13, 1936 for "Improvements in time controlled electric switches", and reference may be had thereto for a fuller showing and description. Likewise the exact construction of the parts within the valve housing 13 constitutes no essential part of this invention, one construction of the same constituting a part of the subject matter of the co-pending application of Charles H. Rippl, Serial Number 120,362 filed January 13, 1937 for "Improvements in pressure control for pneumatically operated switches" and reference may likewise be had thereto.

The diagrammatically illustrated timing switch valve comprises a plunger 14 vertically reciprocably supported in a frame 15 supported normally at its lower end 16 upon the frame and having below its lower end a piston rod 17 carrying a piston 18 reciprocable in a cylinder 19 in the valve housing 13. A spring 20 normally holds the plunger down. When the plunger 14 moves upwardly, a cam 21 thereon engages a cam follower roller 22 on an oscillatable arm 23 and the roller 22 riding over the cam face rocks the arm 23 clockwise against the tension of a spring 24. The cam 21 passes upwardly beyond the roller 22 and then the spring 24 returns the arm counter-clockwise, the arm having a normal position determined by a stop 25 engaging the lower end of the arm and mounted on a panel or other support 26. When the cam 21 returns downwardly it rocks the roller 22 out of its path without moving the arm 23, the roller for this purpose being mounted on a pivoted arm 27, the rear end of which is normally engaged with a stop 28 by a spring 29.

The tension of the spring 20 may be adjusted by a screw 30 engaging the upper end of the spring and supported on the frame 15.

The arm 23 is secured to a shaft 31 mounted at one end portion to oscillate in a bearing 32 on the frame 15 and at another end portion in a bearing 33. Rigidly secured to the shaft 31 is a pair of switch arms 34—34 having contacts 35—35 on their upper ends, and a mating pair of contacts 36—36 are mounted on pivoted arms 37—37, the arms being yieldable against springs 38—38.

When in the upward movement of the plunger 14 above described, the arm 23 is rocked clockwise, the switch arms 34—34 are moved to effect engagement of the pairs of contacts 35—36 and when the arm 23 again rocks counterclockwise the switch arms 34—34 are moved to break the circuit at the contacts. Thus the contacts are maintained closed for a time interval and while closed electric current flows from a pair of supply mains 184 and 185 by wires 186 and 187 through the switch arms 37—37, contacts 36—36 and 35—35 and switch arms 34—34 through the mains 10 and 11 to supply welding current as above described.

As fully set forth in the above mentioned copending patent applications, the stroke of the plunger 14 may be timed to cause the said current impulse to have any desired duration for performing the weld on the work 9, by adjustment of the spring 20, the spring 24, the shape of the operating face of the cam 21, the rate of admission of air by the valve structure in the housing 13 to the cylinder 19 and in some cases by the kinetic energy of an inertia weight 38 on the arm 23.

At 39 is a source of fluid pressure from which the fluid pressure to operate the switch 12 and the machine 1 is supplied, under the control of a valve device 40, comprising a main stationary housing 41, and a valve element 42 of cylinder form reciprocable in a cylindrical bore 43 to control various fluid passages to be described. The valve element 42 is normally held in a downward position by a spring 44, that position of the valve element 42 being determined by a stop flange 45, and the up-stroke of the valve element 42 being determined by engagement of the stop flange 45 with a shoulder 46. The valve element is arranged to be moved upwardly by an electric winding 47 acting on a solenoid plunger 48.

Within the stationary housing 41 is a piston valve 49 of tubular form closed at its upper end and reciprocable in a bore 50. The piston valve 49 is retained in the upper end of its bore by a spring 51 inside of the valve, the tension of the spring being adjustable by a screw 52 which extends outwardly through the housing and is externally adjustable.

The further description of the valve device 40 will be given in connection with a description of its operation which follows.

Fluid under pressure at the source 39 is conducted by a conduit 53 to a duct 54 at the valve device but with the parts of the valve device 40 in their normal position the pressure is cut off thereat by the valve 49. The fluid is also conducted by a conduit 55 through a pressure reducing device 56 to a conduit 57 and thence to a duct 58 where the pressure is cut off by the valve 42.

The parts are now ready to operate and with work 9 placed in the machine 1, the operator of the apparatus closes a switch 59 and current flows from the supply mains 184—185 by wires 60—60 to energize the winding 47 and raise the plunger 48 and valve 42.

When the valve 42 moves to its upper position, a duct 61 therein establishes communication from the duct 58 through a duct 62 to a conduit 63 which admits the fluid pressure to the cylinder 3 of the machine 1 which moves the electrode 6 downwardly to engage the work for welding. The pressure within the cylinder 3 is communicated by a conduit 64 back to the valve device 40 where it communicates with a duct 65 which opens inwardly into the valve cylinder 50. This duct is normally sealed by the upper end of the valve 49. The pressure in the conduit 64 at the start of the machine piston 4 downwardly is less than the pressure applied to the cylinder 3 by the conduit 63 as is common with piston and cylinder devices such as that of the machine 1 which are designed to develop a high final pressure within the cylinder, but after the piston 4 has moved to engage the electrodes and the full pressure from the conduit 63 builds up in the cylinder 3, the pressure in the conduit 64 correspondingly builds up and therefore after the electrodes 6 and 8 are fully engaged with the work 9, this built up back pressure communicated to the valve 49 through the duct 65 moves the valve downwardly against the spring 51 to a bottom position at which the lower end 66 of the valve engages a stop 67. In this position an annular chamber 68 in the outer wall of the valve 49 establishes communication between the duct 54 above referred to and a duct 69 to which is connected a conduit 70 leading to the valve housing 13 of the switch 12 and the pressure from the source is now applied through this conduit to operate the switch 12 to send a welding current impulse through the work 9, as above described.

The weld is thus completed and then the operator may open the switch 59 and the spring 44 will restore the valve 42 to its original position.

In this position of the valve, the cylinder 3 may exhaust its pressure backwards through the conduit 63 to the duct 62 and thence, as shown, through the duct 61 and out to atmosphere by a duct 71. Similarly, the conduit 64 may discharge backward through the duct 65 and by way of ducts 72, 73 and 74 to atmosphere. The ducts 72, 73 and 74 likewise provide a discharge for the pressure in the cylinder 50 above the valve 49 so that the valve may be restored by its spring 51; and finally, the pressure at the switch 12 may be discharged backward through the conduit 70 to the duct 69 which is now cut off by the valve 49 and thence by way of ducts 74, 75 and 76 may discharge to atmosphere.

In the above described operation, it will be apparent that the machine 1 is supplied by pressure from the source 31 at less than the source pressure due to the pressure reducing device 56. There are numerous reasons why machines such as that indicated at 1 are preferably operated at relatively low pressure. Particularly is this true when the machine 1 is of the hand operated type. In some instances, the machines 1 built by a welding machine manufacturer are designed to be operated at a relatively low pressure whereas operation of the switch 12 may better be effected to better control and time a welding current impulse by higher pressure. On the other hand, it is always desirable to be able to supply all of the operating pressure from a single source such as 39 and with the arrangement above described both pressures are available, one for the machine 1 and the other for the switch 12.

The pressure reducing device 56 may be of any suitable or known construction, its structure not constituting an essential part of the present invention, it being only essential that when fluid is supplied thereto as by the conduit 53 at one pressure, it will flow out therefrom as by the conduit 57 at a reduced pressure. Such devices are well known in this art and a further description is deemed unnecessary.

As will be clear from the foregoing description, the valve device 40 is automatic, a single operating movement given thereto as for example, by the plunger 48, supplying the reduced pressure to the machine 1 and automatic means within the valve 40 (the valve 49) supplying the full pressure of the source to the switch 12 but only after the electrodes 8 and 9 are fully engaged with the work whereby it is not possible for the switch 12 to operate until the electrodes are engaged with the work.

In order to prevent the accumulation of pressure (or vacuum) under the valve 42, a bleeder duct 142 is provided communicating with the atmosphere and with the under side of the valve, and a similar duct 145 under the valve 49 is provided for a like purpose.

Preferably the upper end of the valve 49 is provided with an annular bead 143 at which the upper end of the valve seals the duct 65. The pressure applied to the valve is therefore communicated to less than its full diameter but after the valve starts to move and the seal is broken at the bead 143, the full end area of the valve is exposed to the pressure so that its operation will be positive and it will move the full stroke promptly. If, however, the seal at the bead 143 should leak, then the full end area of the valve would be exposed to the pressure prematurely and to avoid this, a bleeder duct 144 is provided communicating with the atmosphere and with the upper end of the valve 49 outside of the annular bead 143.

Figure 2:
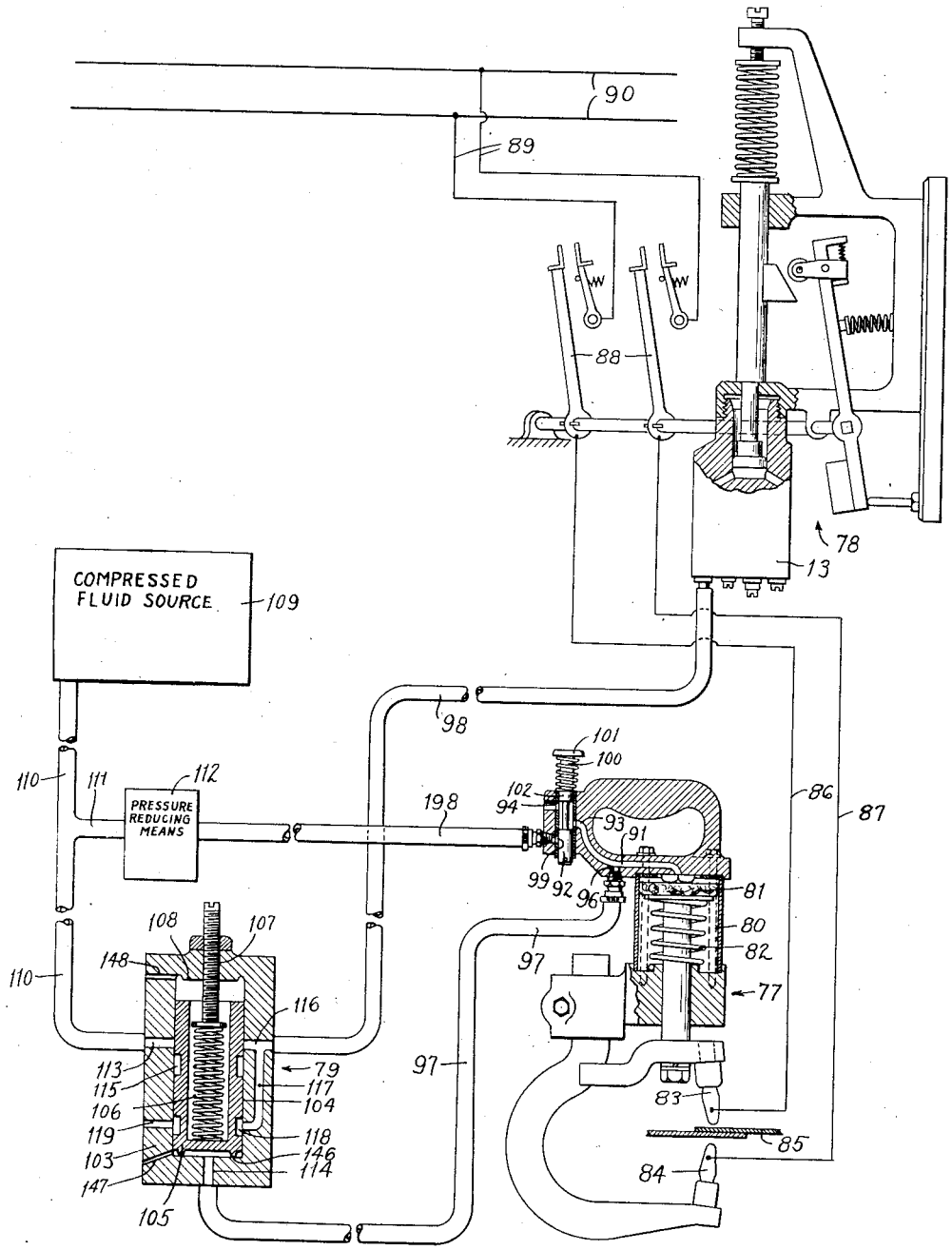
Fig. 2 is a diagrammatic view illustrating the embodiment of my invention in connection with a well known gun type of welding device.

In Fig. 2 is illustrated the application of my invention to the type of welding machine ordinarily referred to as a welding gun shown generally at 77. The current timing switch being shown at 78 and a valve device at 79.

The welding gun 77 comprises a cylinder 80 having a piston 81 therein returnable by a spring 82, the piston 81 arranged to move the electrode 83 toward a stationary electrode 84 to clamp the work 85 therebetween preparatory to welding it. The electrodes 83 and 84 are connected by wires 86 and 87 to switch arms 88—88 which upon operation of the timing switch 78 as a whole, establish a welding circuit by wires 89—89 to the supply mains 90—90. The timing switch device 78 may be identical with that shown in Fig. 1 at 12, and comprising the valve housing 13 of that figure.

The welding gun 77 has, in the frame thereof, a duct 91 communicating at one end with the cylinder 80 and at the other end closed off by an operable piston valve 92; and the duct 91 has a branch duct 93 normally communicating with an exhaust duct 94 around a reduced diameter neck portion of the piston valve 92.

The duct 91 also communicates with a branch duct 96 connected to a back pressure conduit 97.

Pressure is supplied to the gun 77 through a conduit 198 communicating with a duct 99 normally shut off by the piston valve 92. The piston valve 92 is normally held in its inoperative position by a spring 100 and is provided with a button 101. When the operator presses the button 101, the valve 92 is moved downwardly as illustrated in the drawings which causes a large diameter portion 102 of the valve to shut off the exhaust 93—94 and to open a pressure supply through the ducts 99 and 91 to operate the gun 77, as described; and upon releasing the button 101, the spring 100 returns the valve 92 to cut off the pressure supply and open the exhaust.

Guns of this construction are well known in the art and it is believed that the brief description and, in some respects, diagrammatic illustration thereof herein is sufficient.

The valve device 79 comprises a stationary housing 103 having a cylindrical bore 104 therein in which reciprocates a piston valve 105 of tubular form closed at its lower end. A spring 106 within the valve holds it downwardly, the pressure being adjustable by a screw 107 extending through the wall of the housing for external adjustment. In the upward movement of the valve to be described, it is stopped on a stop 108 on the housing.

The source of pressure is shown diagrammatically at 109 and fluid is conducted therefrom by the conduit 110. A branch conduit 111 conducts the fluid to a pressure reducing device 112 whence it flows to the conduit 198.

The conduit 110 also communicates with a duct 113 which in the normal downward position of the valve is cut off by the valve.

When the gun 77 is operated as above described to admit pressure to its cylinder 80, the back pressure in the conduit 97 as explained in connection with the form of Fig. 1 is at a reduced pressure but as the electrodes 83 and 84 are moved toward and upon the work 85, the pressure in the conduit 97 builds up. This pressure is communicated from the conduit 97 through a duct 114 to the valve cylinder 104 and when it reaches the value for which the spring 106 is adjusted, the valve is raised and by means of an annular chamber 115 in the outer wall of the valve, establishes communication from the duct 113 to a duct 116 communicating with the switch operating conduit 98.

Full force pressure is thus applied to the switch and operates it to provide the timed current impulse.

After the weld is made and the button 101 is released, as above described, the pressure in the conduit 97 is exhausted out through the exhaust 94 by way of the duct 93 and the valve 105 is returned downwardly by the spring 106.

Thereupon the conduit 98 communicates by means of the duct 116, and a duct 117 with an annular chamber 118 in the outer wall of the valve 105 and thence communicates with the atmosphere by a duct 119 whereby pressure from the valve housing 13 is exhausted.

As in the first described form, the gun 77 may be operated at a reduced pressure from the source 109 and the timing switch 78 may be operated at full pressure and the automatic valve arrangement 79 insures that the electrodes of the welding gun will be fully engaged with the work before the switch 78 can operate. This form is simpler than that shown in Fig. 1 because of the fact that the pressure exhausts for the gun cylinder 80 and for the conduit 97 are on the gun structure itself.

The valve 105 preferably seals the duct 114 on an annular bead 146 which functions like the bead 143 above described and a bleeder duct 147 is provided for the purposes described in connection with the bleeder duct 144 of Fig. 1. A bleeder duct 148 is provided to function like the bleeder ducts 145 and 142 of the form of Fig. 1.

Figure 3:
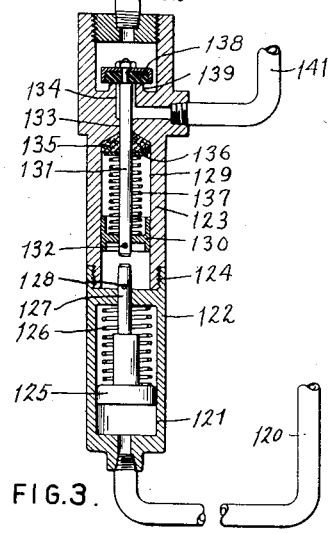
Fig. 3 is a view illustrating in modified form a valve arrangement illustrated diagrammatically in Figs. 1 and 2.

In Fig. 3 is illustrated one form of structure which may be used in practice for the diagrammatically illustrated valve of Figs. 1 and 2. The back pressure conduit 120 communicates with a cylinder 121 formed in a housing member 122 which is threadedly jointed to another housing member 123 at 124. A piston 125 reciprocates in the cylinder 121, being held downwardly by a spring 126, and being supported by a piston rod 127 extending upwardly through the housing member 122 into the open lower end of the housing member 123 and having a pin 128 projected through the rod above the housing 122.

The housing member 123 has a cylinder 129 therein in which is reciprocable a guide 130. A valve stem 131 is projected downwardly through the guide 130 and a pin 132 is projected through the rod below the guide 130.

The rod, at its upper end, extends through a small bore 133 into a cylindrical passageway 134 and the bore 133 is sealed by a packing 135 which is compressed around the valve stem by a washer 136 held tightly thereupon by a spring 137 surrounding the stem 131 and reacting at one end upon the washer 136 and at the other end upon the guide 130.

Upon the upper end of the valve stem 131 is mounted a disc form valve 138 which is held downwardly upon an annular valve seat 139 by the spring 137. Above the valve 138, the housing 123 is connected to the source pressure conduit 140. A switch pressure supplying conduit 141 communicates through the side of the housing with the passageway 134.

Fluid under pressure in the conduit 140 is cut off from the conduit 141 normally by the valve 138. When the back pressure in the conduit 120 has reached a value determined by the spring 126, the piston 125 is moved upwardly and the upper end of the piston rod 127 engages the lower end of the valve stem 131 and lifts the valve 138 whereupon the full pressure from the conduit 140 is communicated to the conduit 141 for the purposes hereinbefore described in connection with Figs. 1 and 2.

Although I have illustrated and described my invention in connection with a pressure reducing means by which one pressure operated device such as a welding apparatus may be operated at one pressure and another device such as an electric switch may be operated at another pressure, my invention may be practiced and the advantages of the pressure operated valve operating after initiation of operation of one of the devices, may be enjoyed, if both devices are operated at the same pressure; or if the second-to-operate device is the one to operate at the reduced pressure; or, in fact, if the two devices are operated from entirely separate sources of fluid pressure.

Although I have illustrated the welding current to the welding electrodes 83—84 of 6—9 as supplied directly from current supply mains, it is to be understood that it may be supplied from the secondary of the transformer as is, in some applications, the customary practice.

Changes and modifications may be made within the scope and spirit of my invention without sacrificing its advantages and within the scope of the appended claims.

I claim:

1. In a fluid pressure system for operating two devices one at high velocity and the other at low velocity, each device having an expansible fluid pressure chamber, a source of relatively high fluid pressure and a source of relatively low fluid pressure, conduit means between the lower pressure source and the chamber of the low velocity device, an operable valve controlling the conduit to admit fluid pressure to the chamber of the lower velocity device to operate it, and to cause pressure in the chamber to rise toward the pressure of the source, a fluid pressure operable valve having conduit communication with the said chamber of the low velocity device and operable upon rise of pressure in the chamber to a predetermined value, conduit means between the source of high fluid pressure and the high velocity device and controlled by the fluid pressure operable valve to admit high source pressure to the chamber of the high velocity device upon operation of the fluid pressure operable valve.

2. The system described in claim 1 and in which the operable valve is electro-magnetically operable and means is provided to restore it, and conduit means is provided by which when it is restored it effects exhausting of the pressure communicated to the fluid pressure operable valve.

3. The system described in claim 1 and in which the operable valve is provided with means to restore it and conduit means is provided by which when it is restored it exhausts the pressure communicated to the fluid pressure operable valve.

4. In a fluid pressure system for operating two devices one operable by relatively high fluid pressure and the other operable by relatively low fluid pressure, each device having an expansible fluid chamber, a source of relatively high fluid pressure and a source of relatively low fluid pressure, conduit means between the lower pressure source and the chamber of the low pressure operable device, an operable valve controlling the conduit to admit fluid pressure to the chamber of the low pressure operable device to operate it, and to cause pressure in the chamber to rise toward the pressure of the source, a fluid pressure operable valve having conduit communication with the said chamber of the low pressure operable device and operable upon rise of pressure in the chamber to a predetermined value, conduit means between the source of high fluid pressure and the high pressure operable device and controlled by the fluid pressure operable valve to admit high source pressure to the chamber of the high pressure operable device upon operation of the fluid pressure operable valve.

5. The system described in claim 4 and in which means is provided to discontinue the application of fluid pressure to the pressure operable valve and means is provided to then restore it, and, upon restoring, it exhausts fluid pressure from the chamber to one of the devices.

6. The system described in claim 4 and in which means is provided to discontinue the application of fluid pressure to the pressure operable valve and means is provided to then restore it, and, upon restoring, it exhausts fluid pressure from the chamber of the high pressure operable device.

7. The system described in claim 4 and in which means is provided to restore the operable valve, and, upon restoring, it discontinues the application of fluid pressure to the pressure operable valve and means is provided to then restore the pressure operable valve.

8. The system described in claim 4 and in which means is provided to restore the operable valve, and upon restoring, it discontinues the application of fluid pressure to the pressure operable valve and means is provided to then restore the pressure operable valve, and, upon restoring, it exhausts pressure from the chamber of one of the devices.

9. The system described in claim 4 and in which means is provided to restore the operable valve, and, upon restoring, it discontinues the application of fluid pressure to the pressure operable valve, and means is provided to then restore the pressure operable valve, and, upon restoring, it exhausts pressure from the chamber of the high pressure operable device.

10. The system described in claim 4, and in which means is provided to restore the operable valve, and, upon restoring, it exhausts pressure from the chambers of both of the devices.

11. The system described in claim 4 and in which means is provided to restore the operable valve, and, upon restoring, it discontinues the application of fluid pressure to the pressure operable valve, and means is provided to then restore the pressure operable valve.

12. The system described in claim 4 and in which means is provided to restore the operable valve, and, upon restoring, it exhausts pressure from the chambers of both devices, and discontinues the application of pressure to the pressure operable valve, and means is provided to then restore the pressure operable valve.

CHARLES H. RIPPL.